(No Model.)
G. TROLLER.
BRAKE FOR STREET CARS.
No. 363,777. Patented May 24, 1887.
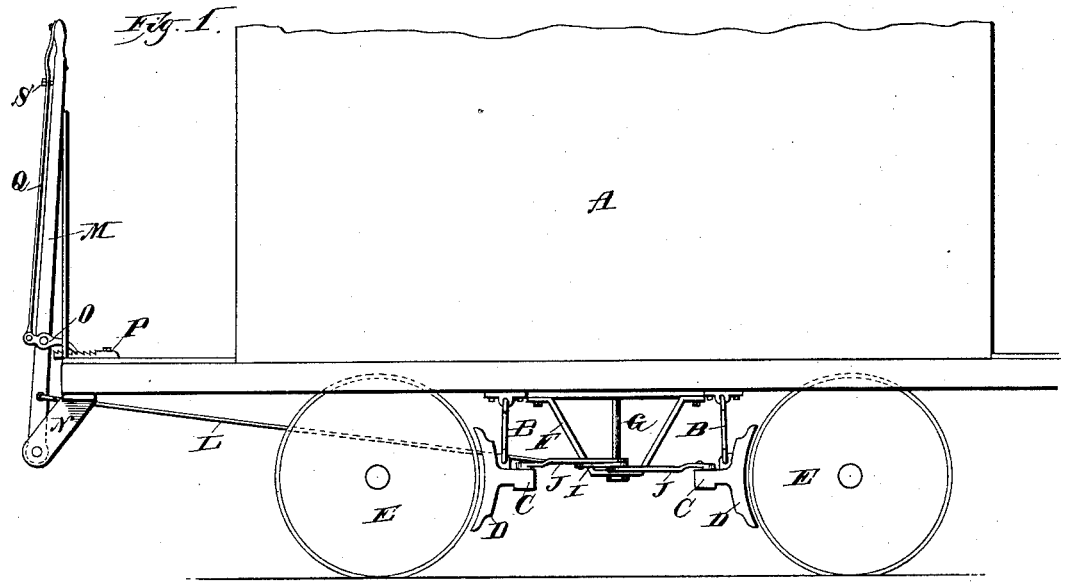
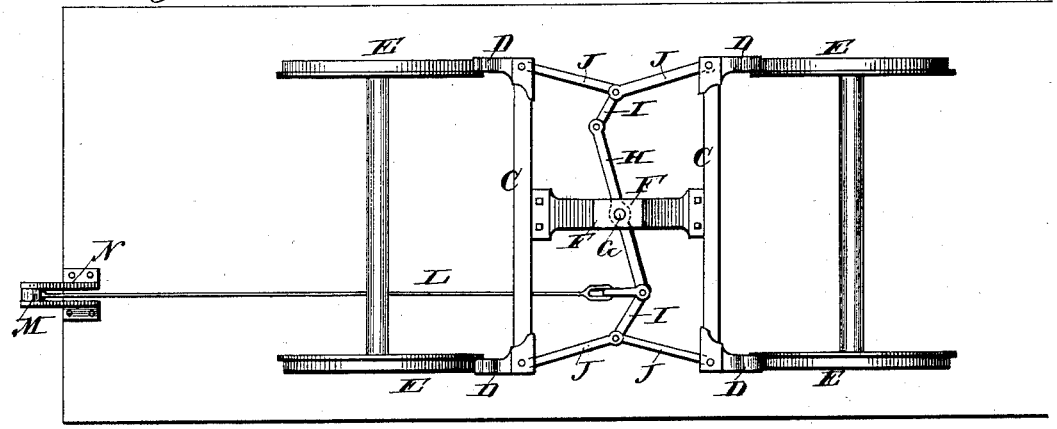
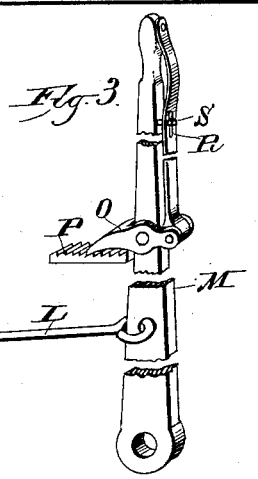
Witnesses:
E. G. Asmus
N. E. Oliphant
Inventor:
George Troller
By Stout & Underwood
Attorneys

UNITED STATES PATENT OFFICE.

GEORGE TROLLER, OF MILWAUKEE, WISCONSIN.

BRAKE FOR STREET-CARS.

SPECIFICATION forming part of Letters Patent No. 363,777, dated May 24, 1887.

Application filed February 8, 1887. Serial No. 226,888. (No model.)

*To all whom it may concern:*

Be it known that I, GEORGE TROLLER, of Milwaukee, in the county of Milwaukee, and in the State of Wisconsin, have invented certain new and useful Improvements in Brakes for Street-Cars and other Vehicles; and I do hereby declare that the following is a full, clear, and exact description thereof.

My invention relates to brakes for street-cars and other vehicles; and it consists in certain peculiarities of construction and combination of parts, to be hereinafter described with reference to the accompanying drawings, and subsequently claimed.

In the drawings, Figure 1 represents a side elevation of a vehicle having my brake applied thereto; Fig. 2, a plan view of the same, looking up; and Fig. 3, a detail perspective view of the brake-lever.

Referring by letter to the drawings, A represents a street-car or other vehicle, from the under side of which is suspended, by means of links B, the beams C, that carry the brake-shoes D, arranged to be brought in and out of contact with the wheels E of said vehicle. A bracket, F, is centrally suspended from the under side of the vehicle, and in this bracket is journaled a vertical post, G, to which latter is rigidly secured a transverse bar, H. A toggle-link, I, unites the respective ends of the bar H with arms J, that are pivotally connected to the beams C, that carry the brake-shoes D, and a shackle, K, connects said bar with the rear end of a rod, L, that has its forward end fastened to the brake-lever M; the latter being fulcrumed to a bracket, N, secured to the vehicle. The brake-lever has pivotally connected thereto a dog, O, that is arranged to engage a ratchet-plate, P, on the vehicle, and this dog is also pivotally connected to the lower end of a spring-plate, Q, that has its upper end made fast to said brake-lever.

A slot, R, in the spring-plate O forms a guide for a lug, S, on the brake lever, and when the curved portion of this spring-plate is compressed by the operator the vertical movement of said spring-plate will serve to raise the dog O, to bring the latter out of contact with the ratchet-plate P.

If found desirable, the slot R in the spring-plate and the lug S on the brake-lever may be omitted.

When the brake-lever M is pushed forward, the transverse bar H is brought more or less in line parallel with the brake-beams C, and the arms J are forced outward, to move said beams, and thereby bring the shoes D against the wheels E, and the dog O automatically engages with the ratchet-plate P, to retain the brake in its set position until released by the operator.

Having thus fully described my invention, what I claim as new, and desire to secure by Letters Patent, is—

1. In a brake for street-cars and other vehicles, the combination of loosely-hung beams carrying brake-shoes, arms pivotally connected to the respective ends of the beams, a pivotal transverse bar, toggle-links connecting said arms and bar, and a lever mechanism for actuating the bar, as and for the purpose set forth.

2. In a brake for street-cars or other vehicles, the combination of loosely-hung beams carrying brake-shoes, arms pivotally connected to the respective ends of the beams, a bracket centrally suspended from the vehicle, a post journaled in the bracket, a transverse bar rigidly secured to the post, toggle-links connecting said arms and bar, and a lever mechanism for actuating the bar, as and for the purpose set forth.

3. The combination of the lever having a dog pivotally connected thereto, a spring-plate having one end thereof pivoted to the dog and its other end made fast to the lever, and a ratchet-plate for engagement with said dog, as and for the purpose set forth.

4. The combination of the lever provided with a lug and having a dog pivotally connected thereto, a slotted spring-plate having one end thereof pivoted to the dog and its other end made fast to the lever, and a ratchet-plate for engagement with said dog, as and for the purpose set forth.

5. In a brake for street-cars or other vehicles, the combination of loosely-hung beams carrying brake shoes, arms pivotally connected to the respective ends of the beams, a pivotal transverse bar toggled to said arms, a lever having a dog pivotally connected thereto, a spring-plate secured at one end to the dog and made fast at its other end to the lever, a ratchet-plate to engage said dog, and a rod connecting said lever with the transverse bar, as and for the purpose set forth.

In testimony that I claim the foregoing I have hereunto set my hand, at Milwaukee, in the county of Milwaukee and State of Wisconsin, in the presence of two witnesses.

GEORGE TROLLER.

Witnesses:
   MAURICE F. FREAR,
   N. E. OLIPHANT.